United States Patent [19]

Hays

[11] 4,313,507

[45] Feb. 2, 1982

[54] WEIGHT PORTIONING METHOD AND APPARATUS

[76] Inventor: Gordon W. Hays, P.O. Box 532, Cedar Rapids, Iowa 52406

[21] Appl. No.: 165,570

[22] Filed: Jul. 3, 1980

Related U.S. Application Data

[63] Continuation of Ser. No. 884,824, Mar. 9, 1978, abandoned, which is a continuation of Ser. No. 679,348, Apr. 22, 1976, abandoned.

[51] Int. Cl.³ ............................................. G01G 13/00
[52] U.S. Cl. ......................................... 177/1; 177/25; 209/592; 364/567
[58] Field of Search ...................... 177/1, 25, 70, 122, 177/123; 209/592, 593, 594, 595; 364/466, 567

[56] References Cited

U.S. PATENT DOCUMENTS

| | | | |
|---|---|---|---|
| 2,470,916 | 5/1949 | Carruthers | 177/1 X |
| 2,781,993 | 2/1957 | Magnuson | 177/1 |
| 2,802,658 | 8/1957 | Hensgen | 177/1 |
| 3,557,889 | 1/1971 | Reusa | 177/1 |
| 3,708,025 | 1/1973 | Soler | 177/1 |
| 3,938,601 | 2/1976 | Hobart | 177/1 |
| 3,939,928 | 2/1976 | Murakami | 177/1 X |
| 3,974,888 | 8/1976 | Murakami | 177/1 X |

Primary Examiner—Joseph W. Hartary
Attorney, Agent, or Firm—Schuyler, Banner, Birch, McKie & Beckett

[57] ABSTRACT

Methods of portioning by weight a plurality of articles of randomly varying weight. An array of articles is randomly assembled and then individual weights sensed. Some of these articles are then selected, to add up to the desired total weight. A preliminary step can be used wherein articles of unknown weight are first assembled to form a preliminary weight portion known to be short of the desired final weight, and then articles of known weight are added to reach the final target weight. An apparatus for accomplishing the methods comprises an array of scales dischargable upon signal from a control system, means for resupplying the scales, and a control system for sensing, storing and analyzing the weights of articles in the scales, and causing the proper scales to be discharged.

12 Claims, 3 Drawing Figures

WEIGHT PORTIONING METHOD AND APPARATUS

This is a continuation of application Ser. No. 884,824, filed Mar. 9, 1978, now abandoned, which is a continuation of Ser. No. 679,348, filed Apr. 22, 1976, now abandoned.

BACKGROUND OF THE INVENTION

This invention relates generally to the portioning and packaging by weight of items normally sold in packages of fixed weights, and particularly to the portioning and packaging by weight of a plurality of articles of randomly differing weights, such as fruits and vegetables.

In any scheme of packaging food commodities into conveniently small packages of equal weight portions, the packager wants ideally to have each portion conform exactly to the desired package label weight. To abide by consumer protection laws, the packager must insure that each package contains at least the stated label weight. While any weight in excess of this required minimum is of no concern to the authorities, it is of prime concern to the packager as it represents a serious loss of profit. To portion exactly to the minimum weight, however, is impractical, as it would require too much weighing, calculating, portion adjustment, and individualized effort, and thus is too costly.

Over the years, packagers have well advanced the art of rapid packaging, particularly with regard to combating weight variation error sources such as scale inaccuracies, product feed control, moisture shrinkage, density variations, package tare weight variation, and the like. To a large degree, packagers of granular and liquid items have been quite successful in improving these arts, frequently achieving efficient production speeds while maintaining long term average overweight losses of less than one percent of the package label weight. Packagers of weight portioned discrete individual articles, such as fruits and vegetables, have not equally benefited, however, from such advancements in the art.

In the weight portioning of discrete articles of varying and variable individual weights, such as fruits and vegetables, an additional error source overshadows the aforementioned considerations. With such items, even though harvested ripe from one particular field or farm, and thus afforded equal growing opportunity, it is common to observe weight variations among the individual articles ranging as high as eight to one. The most usual method of weight portioning such items is by feed mechanisms intended to dispense the last few articles sequentially, one-at-a-time, into a container residing on a scale. The scale is set at a target weight setting, usually equal to the required minimum portion weight plus an allowance for one or more of the known error sources, and halts the feeding of articles into the container as soon as a final article causes the weight to equal or exceed the target weight setting of the scale. Owing to the randomly highly variable individual weights of the articles progressing through the feed mechanism, the group weight of the portion being collected is highly variable just prior to the addition of the final portion-completing article. Also, the individual weight of the final article is equally unknown and variable. These two combine, even in mechanisms that precisely limit the feeding of articles to one-at-a-time, to provide an uncontrolled varying overweight that can range upward to almost the weight of the final article itself. While the occasional group may complete at just precisely the required minimum target weight, the long term average of such portionings are observed to be overweight by a substantial fraction of the average weight of one article.

With the increasing trend toward smaller packaged portions by weight, brought about by demands of consumer convenience, the serious nature of this overweight loss can better be appreciated. It is not uncommon today to package fruits and vegetables to weight portions resulting in as few as five or six discrete articles. With these packages, long term average overweights are commonly ten percent or more in excess of the minimum package label weight, sharply contrasting with the fractional percent associated with granular or liquid items. Various systems have been proposed to combat this problem. In general, these schemes involve some initial separation process to reserve the smallest size articles for final topping use; the rejection and repackaging of portions underweight or excessively overweight; the pre-classification by weight for the purpose of achieving overweight reduction by counted combinations; and others. These schemes have variously failed, or proved of limited economic benefit, due to many reasons, including limited availability of small topping articles within the parent supply, lost packaging materials and production speed, cumulative inaccuracies of multiple weighings, difficulties in insuring that articles of all weights are promptly packed, complexity and expense of apparatus, and like reasons. Therefore, there now exists a demand for a method of portioning and packaging items such as fruits and vegetables much more accurately.

Accordingly, it is an object of this invention to provide an accurate method for weight portioning and packaging items of varying and variable individual weights such as fruits and vegetables. It is a further object of this invention to provide a method which will insure the prompt packaging of all articles contained within a parent large bulk supply of variable weight articles, including those articles which are very large or very small. While it is not an object of this invention to advance the art of controlling previously mentioned sources of overweight errors common to the portioning of granular and discrete items alike, it may well be that my teachings will be applicable in some way to that field also.

DESCRIPTION OF THE INVENTION

This invention sets forth several basic concepts upon which are built a number of methods. The ultimate objective is consistantly to arrive at a weight portion within an acceptable range, determined at the lower end by the requirement that each package produced attain the minimum legally acceptable weight, and at the upper end by that point at which the long term average of the actual overweights of all packages produced becomes unacceptable from an economic point of view. Coupled with this ultimate conceptual objective is the practical objective of repeatedly portioning within the acceptable range at a rapid rate, using the most simple apparatus.

Necessarily, scales are involved in any weight portioning apparatus, and the description hereafter is based upon the use of a multiple number, or array, of scales. It will become apparent to those skilled in the art that the teachings of this invention in certain of the methods set forth in the context of an "array of scales" could equally well apply to a sequential repeated use of a lesser number of scales, or a single scale alone, when coupled with multiple memory means, which may in many circumstances achieve the same end. While the particular situation will determine the most optimum type of apparatus, this description will, for simplicity, be limited to the use of an array of scales.

This invention deals with the portioning by weight into groups of a plurality of articles of varying and variable individual weights. The benefits of the invention are not realized in use with articles of constant, or only slightly varying weights, for these cause few problems by conventional techniques such as purely by count, for example. Typically, items such as fruits and vegetables are delivered to packing houses in very large bulk quantities, as a single harvest from a field, farm, or even several farms within a region. While these items are quite uniform in most respects, they vary sharply by weight among individual articles, even though these articles have all had a relatively equal growing opportunity. This large bulk supply may be termed a population of articles, near identical in most respects, but with widely differing individual weights. All of these articles must be promptly packed as each harvest is made, both for reasons of freshness, and to facilitate processing of following harvests.

The total population has an average weight per individual article, and this weight must be determined as a basic consideration in this invention. Very few articles within the population will actually have exactly this theoretical average weight, but a large percentage of the population will be found to consist of articles only slightly heavier or slightly lighter than this average weight. A lesser percentage of the articles will be found to be substantially lesser or greater than the average, and a very small percentage will be found to be very greatly heavier or lighter than this theoretical average. Thus a population will be found to possess a frequency of occurrence of various actual individual weights that varies inversely with their deviation from the average individual weight of the population. An accurate prediction of the frequency of occurrence of articles of any specific weight, or narrow range of weights, may be determined by recourse to statistical methods.

According to a basic step in all the inventive methods, a plurality of articles is assembled, weighed, their individual weights remembered, and the articles kept ready for selection. A practical way to do this is to provide an array of scales, means for resupplying an empty scale with an article, means for storing, comparing, and adding the weights of the articles, and means for removing an article from a scale. Although the discussion herein is primarily concerned with a single article in each scale, a plurality of articles could be placed in one or more scales, if, for example, large weight portions were being assembled. The first basic step necessitates that a certain number of stations, each advantageously in the form of a scale, be established for holding the necessary number of articles. The number of stations in the array is chosen, according to these teachings, to be at least in excess of the total number of articles of the determined theoretical average weight of the population that would be required to complete the intended portion weight of the group. According to a basic step, an analysis is made of all the individual weights of the ready articles held in the array, or additive combinations of these individual weights, to determine which article, or combination of articles, should be selected from the choices available to most minimally satisfy the required portion weight.

Thus, in the case of one inventive method later to be described in more detail herein, where the preferred number of articles to be selected from the array is one article; the required number of positions in the array would, according to this teaching, be minimally two positions. In actual practice, the number of positions to fully achieve the benefits of this invention is further determined by knowledge of the range of deviation of article weights from the population's average weight, the probability and frequency of occurrence of specific individual weights, and the degree of economic benefit practical from reduction in long term average portion overweights. By way of example, the number of articles intended to be usually selected from the array, to minimally complete the required portion weight, is one article. The number of choices afforded by an array of ready articles numbering between fifteen and twenty, more or less will, in the very great majority of repeated portionings, offer enough choices of portion completing article (or articles) that will result in only a very slight overweight. Properly conceived, the long term average overweight of all such groups repetitively so portioned has been found to be only a very small fraction of the weight of one average weight article.

Further, in the case of another inventive method to be described herein, if a multiple number of articles are to be selected from the array to complete the required portion weight, say, for example, six articles of approximately average individual weights are required; then again an array of ready articles numbering from fifteen to twenty, more or less, will permit selection of combinations of articles with similarly beneficial minimal resulting average portions. It must be remembered that with variable weight articles to select from, the final number of articles in each group need not necessarily be exactly six, but can be more or less than six, thus widely expanding the possible number of additive combinations that may be constructed.

In some of the inventive methods, two steps are used to achieve the final target weight. The first step is designed to be accomplished swiftly and will normally provide the bulk of the total weight. The second step is a topping-off, or trim step designed to achieve the final target weight. The first order of business in the two step methods is to decide upon an initial target weight, less than the final target weight. In accordance with this invention, the initial target weight is chosen to be less than the final target weight by a weight in excess of the weight of one average article of the population.

The first step, or initial target weight, can be achieved by many systems. For example, it can be by bulk weighing or dispensing followed by a dribble feed of articles one-at-a-time onto a scale, which feed is halted the moment that the last added article causes the initial target weight to be reached or exceeded. Where very small numbers of articles are required to achieve the initial target weight, a dribble feed alone might be used. When dealing with articles varying only moderately in weight, whether by a prior approximate broad classification by weight or by natural reasons, an approximation of the initial target weight might be reached by simply counting out a number of articles Further, when dealing with articles that bulk uniformly such as articles that are generally round, or spherical, ar approximation of the initial target weight may be achieved by assembling a known volume (cubic inches or cubic feet) of articles. The actual weight of the group of articles achieving the initial target weight is remembered, and the second step of topping-off, or trimming, is then accomplished. A collection of ready individual articles from the parent population is assembled, weighed, their weights remembered, and the articles kept ready for selection. An analysis is made of the weights of all ready articles to determine which article, or combination of articles, will equal the difference between the achieved weight of the initial target weight group, and the minimum desired final target weight. This choice is made, and the selected trim articles added to the initial group, thus completing the total portion.

This invention advances the novel concept of making the initial target weight short of the final target weight by more than the weight of one average article. The actual weight of each group achieving the initial target weight cannot be predicted in advance. Some initial groups will equal or be only a slight amount in excess of the initial target weight. Some will be substantially in excess of the initial target weight, in some cases achieving the final target weight directly and thus requiring no trim step addition. The great majority of initial weight groups will, however, lie amid these extremes. It has been found that an acceptable initial target is one that is short of the final target weight by about one and one-half average article weights, for items such as fruits and vegetables. Then, virtually any of the ready articles available to trim can be used. Those few initial weight groups that only slightly exceed the initial target weight will require the heaviest of the available trim articles, or two articles of lesser weight. Those few initial weight groups that require but a small addition, will use the lightest of the available trim articles. The majority of the initial groups will, however, be found to be short of the final target weight by approximately the weight of one average weight article. Thus, this majority of the achieved initial weight groups will require the addition of a trim article of approximately the average weight, more or less. Since the source of trim articles, like that of the articles forming the initial weight group, is randomly from the parent population, and articles in the parent population with weights close to the theoretical average weight are in preponderance, the chances are very high that a choice of a trim article of exactly or only minimally above that weight required to be added to just minimally achieve the final target weight will be available. Thus, the majority of the final groups will just equal or only minimally exceed the minimum acceptable final target weight. Further, although very small, or very large, articles will be in the minority of those articles being delivered into the collection of trim articles, due to their minority in the parent population, the demand for these will be in proportion thereto when the initial weight groups are portioned to achieve an initial target weight of about one and one-half times the weight of an average weight article less than the final target weight. Thus the demand for and availability of all varying weights of articles will be in proportion to their frequency of occurrence in the parent population, and a prompt packing of all articles randomly delivered from the parent population will be assured with an attending beneficial minimal long term average overweight.

The basic theory of this method can be better appreciated by considering an explanation of a simplistic system which makes use of the inventive teachings. In this hypothetical situation, it has been statistically determined that the articles of a population average one pound in weight. The object is to package in ten pound portions. This means, under the two-step method, that an initial target weight setting of eight and one-half pounds will be selected. A dribble feed can be used which, for this example, drops a number of articles to first equal or exceed the initial target weight, and then ceases feeding. For example, let us suppose that an article dribbled into the container, not yet containing eight and one-half pounds, causes the actual net weight to now total eight and nine-tenths pounds. This article therefore is the final article needed to achieve the initial target weight, and the dribble feed then is stopped. The system computes that what is needed to trim is the addition of an article weighing at least one and one-tenth pounds. Available are ten choices, for example, of articles selected at random, weighed, and their weights recorded. In line with the statistical analysis, there is a good chance that an article weighing exactly one and one-tenth pounds will be present among the ten available trim articles, since that weight is so close to the statistical average weight in the population. If by chance no available article has that weight, the search is expanded to attempt to locate a combination of two or more trim articles, which total in weight one and one-tenth pound. If this too, cannot be found, a single article or combination of articles is sought weighing slightly more than one and one-tenths pound. The search is further expanded to a slightly greater weight, if necessary, and as the search is expanded upward, by even very small amounts, the combined chances approach a virtual certainty that an article, or a combination of lesser weight articles, will be available to satisfy the final target weight with only a very slight overweight, well within the economically feasible range.

The teachings of this invention can best be understood by considering a number of methods in which they are utilized, as follows:

Method A

This method does not use a trim step, but only a single analysis and selection of articles. The first step in this method is an analysis of the population of articles to be weight portioned. The average weight of the articles in the population is determined, thus determining the average number of articles that will theoretically be present in the desired weight portion. This need not, of course, be a multiple of a whole number, but is a mathematical number of articles of theoretically average weight that are required to be present in a minimal final weight portion.

The second step is to analyze the variation in weight among the articles of the population and to determine the number of ready articles required to be made available to satisfy the desired weight portion with an attending acceptable control of long term average overweight. The number of immediately available articles (ready articles) will usually be significantly greater than the determined number of average weight articles needed per portion.

The third step is to collect the number of ready articles determined by the second step, and to weigh each and store the weight of each.

The fourth step is to analyze the weights of each ready article, and select a combination of ready articles, the total weight of which equals or most minimally exceeds the final desired weight of the portion.

Finally, the selected articles are retrieved and combined into the weight portion.

For example, if carrots are to be packaged in one pound portions, an analysis is made of the carrots to be packaged. Such analysis may, for example, determine the average weight of a carrot of this population to be one-fifth pound. Under optimum circumstances, therefore, five average weight carrots will be needed to comprise a one pound weight portion. There need not necessarily be five carrots in each portion, for the total population will have considerable numbers of carrots weighing less or more than one-fifth pound. An analysis of the variation in weights among the carrots may show, for example, that one must look repetitively at a ready collection of twenty carrots in order to be able to consistently select acceptable groups with final portion weights averaging no greater than, say, one-fiftieth of a pound overweight.

An apparatus for accomplishing the above method can be as follows: Based on the above analysis, twenty scales are assembled, along with appropriate apparatus for resupplying the scales as necessary, weighing and recording the weights, and performing the analysis necessary to select the most optimum combination to equal or minimally exceed one pound. The scales can be tilt discharge units that dump their contents into a container. As each carrot arrives at a scale, it is weighed and the weight stored in a computer. To assemble the one pound weight portion, the computer looks at all twenty weights, selects a proper combination, and activates the proper scale discharging mechanisms of the scales holding the selected articles. The emptied scales are then automatically resupplied.

In order to insure that no article remains unselected for an unduly long time, the inventive method may also include the step of arbitrarily selecting the weight contained in one particular scale each time to be an included weight in all combinations of the weights with other ready articles to be analyzed, whether or not it would have been selected otherwise. Thus the contents of that particular scale will be included and emptied in that portion being assembled. The particular scale selected may be the one that has been observed to be too long in not having been normally selected, or a different scale may be selected each cycle as being the scale to be arbitrarily included in the analysis to obtain the portion combination, in round robin fashion.

Method B

While the above described method involves a single step for the actual weight portioning, the remaining method examples involve a two step process. First, there is an initial portioning to a predetermined initial target weight. The second step is a trim step to the final desired target weight.

Basic to the inventive concepts present in this and the remainder of the described methods is the determination of the magnitude of the initial target weight. To fully appreciate the reasons for the inventive theory, one must understand the reasons for using the two step filling concept. The initial step involves the major portion of the total required weight, and can be accomplished quickly. Although accuracy in the accomplishment of the initial step is not to be ignored, the focus is more on speed. During the trim step, accuracy is the key factor, within reasonable economic restraints, of course. In accordance with the teachings of this invention, the initial filling target weight comprises the final target weight minus *more than* the weight of one average article. The extent of "more than" is based upon an analysis of the average of resulting weights of groups portioned to achieve an initial target weight, plus a consideration of the percentage of over average weight articles, and how much over the average weight they are. Ideally, the intent is that the actual average of the weights of these initial groups be short of the final target weight by the weight of one average article. Thus, most initial groups will require the addition of one article which is approximately average in weight, and accordingly most available among the trim articles. Less frequently, initial weight groups will complete at a weight only slightly above the initial target weight, or at a weight substantially above the initial target weight. These groups will require for final trim additions, those less frequently occurring very heavy or very light trim articles. Properly conceived, the result is a balance between demand and availability of specific weights occurring among trim articles, maximizing the number of articles that are beneficially useful trim articles. An initial target weight of about one and one-half times the weight of an average article less than the final desired target weight works well. Further considerations are necessary, however, to insure balanced demand and availability. Otherwise, if imbalance is permitted to occur, the long term average of the weights of the final weight portions will exceed the economically acceptable limit. While certain populations of articles will contain no articles heavier than one and one-half times the weight of the average weight article, certain other populations will contain such heavier articles. If the latter be the case, then under certain circumstances the achieved weight of the initial weight group will exceed the final target weight and thus require no trim addition. To insure a more perfect balance between demand and availability of trim articles, it is taught to exclude from the analysis of the average of resulting weights of groups portioned to achieve an initial target weight, the results of those initial groups achieving the final target weight directly, without requiring trim additions. Further, to better insure a more perfect balance, it must be remembered that in actual practice, the long term average of the weights of all final groups portioned under these methods is not intended to equal the minimum acceptable final target weight, but rather to equal a slightly greater economically acceptable long term average portion weight. Therefore it is taught when selecting an initial target weight to equate the difference between the analyzed resulting average of the weights of groups portioned to the initial target weight, and the final economically acceptable long term average portion weight, to the average weight of the trim articles. Demand will be thus in proportion to trim article availability, and a prompt packing of all articles with a minimum attending weight penalty will be assured. The initial target weight can also be short by multiples of the average weight of one article plus an extra one-half average weight. For example, in the case of larger quantities being portioned, or to increase the number of combination choice possibilities from a given number of trim articles, the initial target weight might be two and one-half, or three and one-half, etc., average article weights short of the final target weight.

By this particular method, the first step of portioning to the initial target weight is accomplished by collecting on a scale an initial group of articles having a weight at least equal to one and one-half average article weights short of the final target weight. This can be accomplished by a dribble feed of articles onto the scale until an article dropped causes the weight to go over the initial target weight. The initial weight actually achieved is then compared to the final desired weight to determine the minimum addition required, if any, from the trim articles. The dribble feed can be separate from the trim system, or it can actually use the trim scales, adding trim scales sequentially one-by-one until the initial target weight is achieved. If this be the case, the trim step will probably be accomplished using those remaining ready articles in the array, unless time is allotted to allow resupply of those scales emptied to achieve the initial target weight.

The final or trim step is accomplished in the same manner as the single step of Method A. That is, a number of articles are each weighed, their weights remembered, and the articles made available, for example in a plurality of scales, for selection to top off the initial weight group and achieve the final target weight.

The number of articles required to be available as trim articles is determined like in Method A. However, rather than basing the determination on the entire number of articles required to complete the final weight portion, it is directed only to the number of ready articles necessary to make efficient choice available for the trim amount.

The features disclosed in conjunction with Method A to insure that no article has an unduly long residence in the scales can also be used with Method B. In use with Method B, the weight of the article held in this selected scale would be deducted on that particular cycle from the required initial target weight to be achieved. Thus the weight of this article would be treated as being already present at the start of the initial weight portioning. This article would then be added to the final weight group concurrently with the addition of the trim selections. Sequencing the trim scale selected as an arbitrary inclusion in the initial weight group would insure that no trim article remains unduly long unselected.

Further features can be used in conjunction with Method B to further insure that all articles are promptly packed without excess overweight penalty. These features can be particularly useful in the case of items having extremely variable individual weights. It can be appreciated that with selection of an initial target weight about one and one-half average articles' weight short of the final weight, those articles weighing appreciably more than one and one-half times one average articles' weight will be undesirable as trim selections. Should they be permitted to be present among the trim selections, they would reduce the number of efficient trim selection choices. These articles may be periodically removed and packed without excess overweight penalty in a manner similar to the above feature described as applicable to Methods A and B. In this case, as soon as an article arrives at a trim scale and is recognized as being excessively heavy for trim use, the weight of this article would be deducted from the initial target weight of the next group to be portioned, and treated as already present in that initial target weight group. Again, this article would be added to that final weight group concurrently with the addition of its trim selections. Alternatively, such overweight articles can be prevented from reaching the trim scales with the otherwise random supply from the parent population, by a pre-sizing or pre-classification step enroute to the trim scales. Those articles exceeding any determined limiting weight can be diverted into the supply of articles destined to make up only the initial weight groups, thus continuing to insure the prompt packing of all articles from the supply. Since use of either of these features of preventing excessively heavy articles from being considered for trim selections will somewhat lower the average weight of those articles actually to be used as trim articles below that of the average of the population, this reduced average article weight would accordingly be used in the determination of the initial target weight.

It may be found in the course of portioning a large supply that for appreciable periods of time the actual average weight of the articles arriving as trim articles persists at a value somewhat greater or lesser than the overall average weight of the population. This may occur by chance, or may be a result of an alteration to the population by the addition of articles from a succeeding population to be packed of slightly different average article weight. Should this occur, it will result in an unbalance between the average trim weights required by the actual initial portion weight groups, and the preponderant value of the weight of the available trim articles. This unbalance will, if allowed to persist, force upward the average overweight of the final weight groups beyond the acceptable economic limit. Should this be the case, a step can be included in the method to adjust upward or downward the initial target weight to restore proper balance with the actual average weight prevailing among the available trim articles, when such adjustment is warranted. This may be done by periodically summing the actual weights of all the available trim articles, determining their average weight, and adjusting the initial target weight accordingly.

Method C

This method has much in common with Method B. The key difference lies in the accomplishment of the first step. Again, an initial group is formed with the intent to be short in weight of the final target weight by the weight of one or more average weight articles. But in Method C, the initial step is accomplished not by a continuous weighing process, but purely by counting out a number of articles without regard to weight. This step is based on the theory that the weight of a certain number of randomly collected articles should equal the weight of the population's average weight article times the number of articles collected. Therefore a number of articles that statistically should be about equal to the desired initial target weight are counted out as the initial weight group. This group is weighed, and the trim weight addition required is determined. The second step of selecting the proper trim weight to be added to achieve the final target weight is accomplished like in Method B.

Method C is advantageous where the variation in weight among articles of the population is only moderate, and the count selected is intended to achieve an initial weight group averaging several average articles short of the final target weight. Since a count of articles can be detected at a high rate of speed, and in advance of their arrival into a scale, the arresting of the feed can be initiated in advance of the known last article's arrival, thus overall making more time available for accurate determination of the actual achieved weight of the initial group and the subsequent selection and delivery of the trim articles.

Features disclosed with the preceding methods can also be employed with Method C. In this case, an adjustment of count, rather than weight, would be employed to better achieve a suitable average weight of the initial groups. Under certain conditions, the "count" concept of Method C can be replaced by a volume in cubic inches or cubic feet, for example. Rather than the articles being counted, a container is filled.

Figure 1:
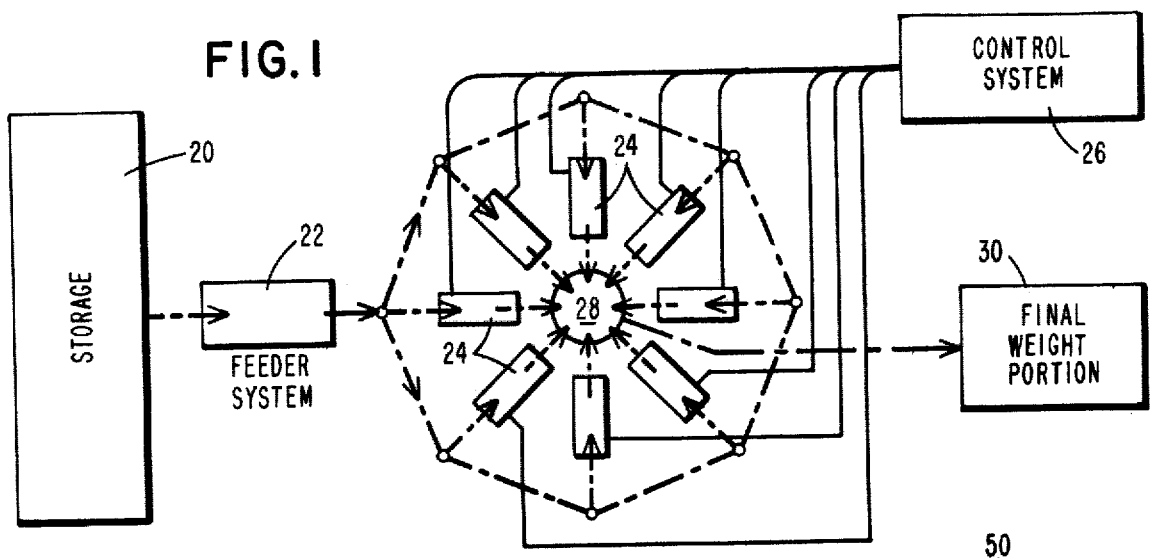
FIG. 1 is a diagrammatic showing of an embodiment of an apparatus chapable of accomplishing Method A. The population of articles to be weight portioned is stored at 20. The articles flow by means of a feeder system 22 to a plurality of scales 24, arranged in a circular array, by way of example. The operation of the feeder system 22 for resupplying the plurality of scales 24 is controlled in a conventional manner by control system 26. The control system 26 also is responsive to weight sensors associated with the plurality of scales 24 for analyzing and selecting combinations of articles. Various techniques are known in the art for selecting different combinations of articles according to weight. Selection of articles is made to achieve the final target weight, the articles dumped into container 28, and moved away to become final weight portion 30.
Figure 2:
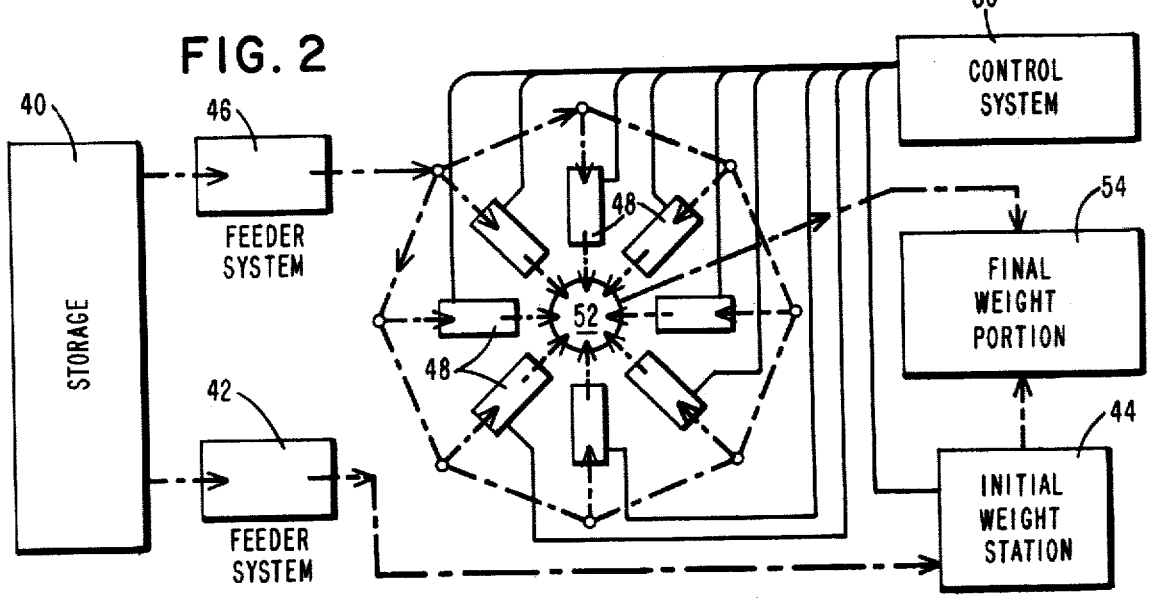
FIG. 2 illustrates an apparatus that could be used to accomplish Methods B or C. A storage 40 holds the population of articles. Some articles are supplied to an initial weight station 44 by feeder system 42, where the initial target weight is achieved by weight count, or volume. Additional articles from the population are supplied to an array of trim scales 48 by feeder system 46. The operation of the feeder systems 42 and 44 is controlled in a conventional manner by control system 50. This control system 50 also selects various combinations of articles according to weight in the manner described above with respect to control system 26. The trim articles are selected and discharged to container 52, which is then moved away to be combined with the initial weight portion 44 to become final weight portion 54.
Figure 3:
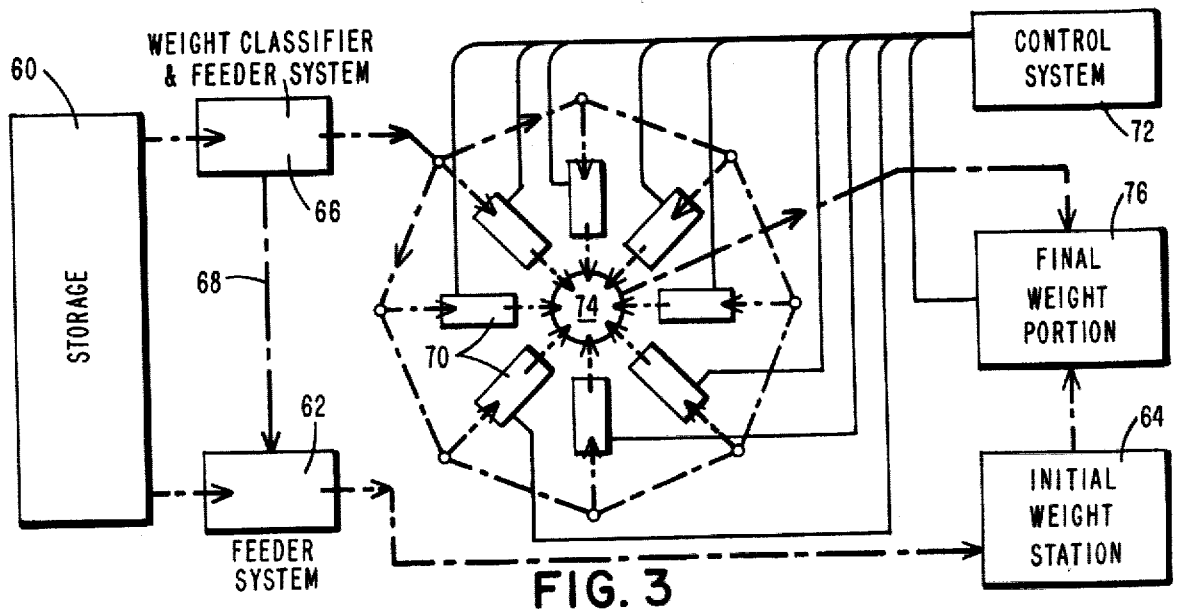
FIG. 3 illustrates a system for accomplishing Methods B or C, with the added feature of limiting the weight of articles at the trim scales to below a predetermined weight. Some articles from the population at storage 60 are first weight classified by weight classifier and feeder system 66. Those articles less than the predetermined weight are advanced to the array of trim scales 70. Those articles found excessive in weight are diverted, via divert route 68, to join with other articles from the population being delivered to initial weight station 64 by feeder system 62. Other operations progress as described for the system of FIG. 2, trim articles being discharged into container 74 and then joined with the initial weight portion 64 to become final weight portion 76. All operations are controlled by control system 72 in a conventional manner as described above with respect to control systems 26 and 50.

Variations and modifications of the above described methods and apparatus may become apparent to one skilled in the art. However, the scope of this invention is not limited by the above disclosure, but is determined by the breadth of the appended claims.

I claim:

1. A method for grouping a population of articles of varying weights into a portion having a weight at least equal to a final target weight comprising the steps of:

determining the average weight of the articles, forming an initial weight station having an initial target weight smaller than the final target weight by a predetermined amount which is equal to the average weight plus a selected fraction of the average weight, setting said selected fraction of the average weight so that, as successive groups of articles from the population of articles achieve the initial target weight in said initial weight station, the frequency of occurrence of the weight differences between the actual weights of said successive groups of articles in said initial weight station and the final target weight corresponds to the frequency of occurrence of individual weights of articles in the population of articles, transporting articles from the population of articles to said initial weight station until the actual weight of the group of articles in said initial weight station is at least equal to the initial target weight, transporting a number of articles from the population of articles to a plurality of trim scales, weighing the articles on each of said plurality of trim scales, selecting articles from said plurality of trim scales having a weight at least equal to and which most closely approximates the difference between the actual weight of the group of articles in said initial weight station and the final target weight, and combining the articles selected from said plurality of trim scales and the group of articles in said initial weight station to form said portion.

2. The method of claim 1 wherein said selected fraction is equal to one-half the average weight of the articles.

3. The method of claim 1 wherein articles are consecutively transported to said initial weight station until the addition of one article causes the total weight of the articles in said initial weight station to achieve the initial target weight.

4. The method of claim 3 further comprising the steps of transporting a number of articles in excess of the number of articles required to form said portion to an array of scales, sequentially selecting scales from said array of scales one at a time and summing the weight of the articles on said scales until the addition of one article causes the total weight to reach the initial weight, and using the remaining scales in said array of scales as said plurality of trim scales.

5. The method of claim 4 further comprising the steps of cyclically operating the method of claim 4 to obtain a plurality of said portions and periodically removing from said array of scales any of the articles not selected within a predetermined number of cycles.

6. The method of claim 1 further comprising the steps of determining the theoretical number of articles of average weight necessary to form the initial target weight and transporting a number of articles corresponding to the theoretical number from the population of articles to said initial weight station without regard to individual weight.

7. The method of claim 6 further comprising the steps of transporting a number of articles in excess of the number of articles required to form said portion to an array of scales, unloading a particular number of scales corresponding to the theoretical number of articles of average weight necessary to form the initial target weight into said initial weight station and using the remaining scales in said array of scales as said plurality of trim scales.

8. The method of claim 7 further comprising the steps of cyclically operating the method of claim 7 to obtain a plurality of said portions and periodically removing from said array of scales any of the articles not selected within a predetermined number of cycles.

9. The method of claim 1 further comprising the initial step of dividing at least a portion of the population of articles into a first stream comprising those articles weighing more than a predetermined amount and a second stream comprising those articles weighing less than said predetermined amount, wherein the articles transported to said initial weight station are obtained at least in part from said first stream and the articles transported to said plurality of trim scales are obtained from said second stream.

10. The method of claim 1 further comprising the steps of cyclically operating the method of claim 1 to obtain a plurality of said portions and periodically removing from said plurality of trim scales any of the articles not selected.

11. The method of claim 10 wherein the articles removed are transported to said initial weight station without regard to their weight.

12. The method of claim 1 wherein the predetermined amount is equal to a multiple of the average weight plus a selected fraction.

* * * * *